(12) United States Patent
Forand

(10) Patent No.: US 6,952,674 B2
(45) Date of Patent: Oct. 4, 2005

(54) SELECTING AN ACOUSTIC MODEL IN A SPEECH RECOGNITION SYSTEM

(75) Inventor: Richard A. Forand, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 10/041,754

(22) Filed: Jan. 7, 2002

(65) Prior Publication Data

US 2003/0130840 A1 Jul. 10, 2003

(51) Int. Cl.$^7$ .......................... G10L 15/06; G10L 15/22
(52) U.S. Cl. ...................... 704/243; 704/246; 704/250
(58) Field of Search ............................... 704/275, 243, 704/244, 246, 247, 250, 261, 270, 270.1; 379/88.01, 88.02

(56) References Cited

U.S. PATENT DOCUMENTS

| | | | | |
|---|---|---|---|---|
| 5,897,616 A | * | 4/1999 | Kanevsky et al. | 704/246 |
| 5,911,129 A | * | 6/1999 | Towell | 704/270.1 |
| 5,933,805 A | * | 8/1999 | Boss et al. | 704/249 |
| 6,049,602 A | * | 4/2000 | Foladare et al. | 379/265.04 |
| 6,058,363 A | * | 5/2000 | Ramalingam | 704/251 |
| 6,088,669 A | * | 7/2000 | Maes | 704/231 |
| 6,182,037 B1 | * | 1/2001 | Maes | 704/247 |
| 6,393,400 B1 | * | 5/2002 | Shigetomi et al. | 704/258 |
| 6,477,493 B1 | * | 11/2002 | Brooks et al. | 704/246 |
| 6,556,971 B1 | * | 4/2003 | Rigsby et al. | 704/270 |
| 6,697,778 B1 | * | 2/2004 | Kuhn et al. | 704/243 |
| 6,826,306 B1 | * | 11/2004 | Lewis et al. | 382/187 |
| 6,842,734 B2 | * | 1/2005 | Yamada et al. | 704/245 |

OTHER PUBLICATIONS

"Help Your Kids Get Their Great Ideas On To The Computer," Product Brochure, Dragon Systems, Inc., 1 pg.
"Dragon Naturally Speaking," Quick Reference Guide, Dragon Systems, Inc., Copyright 1999, 6 pgs.
"ViaVoice™ Pro Millennium Edition Command Reference," IBM Reference Guide, International Business Machines Corporation, Copyright 1999, 6 pgs.
"We'd Like To Give You a Lot More To Talk About," Product Registration, Dragon Systems, Inc., Copyright 1999, 4 pgs.
"Installing Dragon Naturally Speaking," Information Brochure, Dragon Systems, Inc., Copyright 1999, 2 pgs.
"Quick Start—Dragon Naturally Speaking," Product Brochure, Dragon Systems, Inc., Copyright 1999, pp. 1–27.
"Dragon Naturally Speaking," User's Guide, Dragon Systems, Inc., Copyright 1999, pp. 1–163.
"ViaVoice™—Millennium Edition," Pro Millennium Edition, IBM User's Guide, International Business Machines Corporation, Copyright 1999, pp. 1–155.
http://www.philipsspeechprocessing.com—"Acoustic Model," PSP—Telephony—Products & Services—Technology—Speech Recognition—Major Compo, Philips Electronics N.V., Copyright 2001, 1 pg.
http://www.philipsspeechprocessing.com—"Lexicon and Language Model," PSP—Telephony—Products & Services—Technology—Speech Recognition—Major Compo, Philips Electronics N.V., Copyright 2001, 1 pg.

* cited by examiner

Primary Examiner—Martin Lerner
(74) Attorney, Agent, or Firm—Fish & Richardson P.C.

(57) ABSTRACT

A speech-recognition system learns a speech profile of a user whose speech is to be recognized. The system plays audible speech samples, stored in sound files, so that the file that most resembles the user's speech may be selected. After receiving the selection, the system identifies an acoustic model that is associated with the chosen sound file. The system may also select a subset of sound files based on information indicative of the user's speech. The system may then play a subset of sound files so that the file that most resembles the user's speech may be selected.

28 Claims, 4 Drawing Sheets

SELECTING AN ACOUSTIC MODEL IN A SPEECH RECOGNITION SYSTEM

TECHNICAL FIELD

This invention relates to speech recognition, and more particularly to selecting acoustic models for recognizing a user's speech.

BACKGROUND

Speech recognition technology faces the challenge that every person has an essentially unique voice; an individual's set of voice characteristics are sometimes referred to as their "speech profile." Existing speech-recognition systems have addressed the multitude of speech profiles in different ways. Some systems have several adjustable "acoustic models" and select and adjust one of them for each user. An acoustic model is a statistical representation of the occurrence of phonemes, diphones, triphones, etc. By using an acoustic model that fits the user's speech profile, the system can better recognize the user's speech. Other systems use only one acoustic model for all users. Such systems can only recognize a limited set of commands.

The systems with adjustable acoustic models go through a setup procedure to select and adjust an acoustic model so that it best fits the user's speech profile. Initially, the user may select a suitable one among a few acoustic models; for example, two acoustic models may be labeled "American English" and "British English," respectively. In a typical setup procedure, the system adjusts the selected acoustic model by having the user read numerous predetermined text sequences into a microphone. By adjusting the acoustic model while comparing the user's voice with the known contents of the text sequence, the system identifies an adjustment configuration of the acoustic model that best fits the user's speech profile.

One problem with these systems is that it is inconvenient for the user to read the text sequences. Another problem is that it takes time to make the system operable due to the setup procedure. The lengthy setup procedure, in turn, makes it more difficult to continue using the speech-recognition system if the user's voice changes, for example due to illness. These problems also render the existing speech-recognition systems with adjustable acoustic models impractical in applications such as telephony or online services, which cannot accommodate an extensive procedure for setting up the system.

DESCRIPTION OF DRAWINGS

Like reference symbols in the various drawings indicate like elements.

DETAILED DESCRIPTION

The invention provides a speech recognition system that makes several sample voices available for listening such that the one most resembling a user's voice may be chosen. Based on the chosen sample, the system selects an acoustic model and uses it to recognize the user's speech. This may be the sole method that the system uses to select the acoustic model, whereby it does so faster than the adjustment of acoustic models in existing systems. The system may also use this method together with other methods for selecting an acoustic model, and thus improve the accuracy of the speech recognition.

An embodiment of the invention may include a conventional personal computer running a speech-recognition software application. At the outset, it will be understood that a personal computer will not be the only platform on which the inventive speech recognition system could reside. Nevertheless, an exemplary personal computer with a speech-recognition software application will first be described, as a basis for describing the operation of the speech-recognition system.

Figure 1:
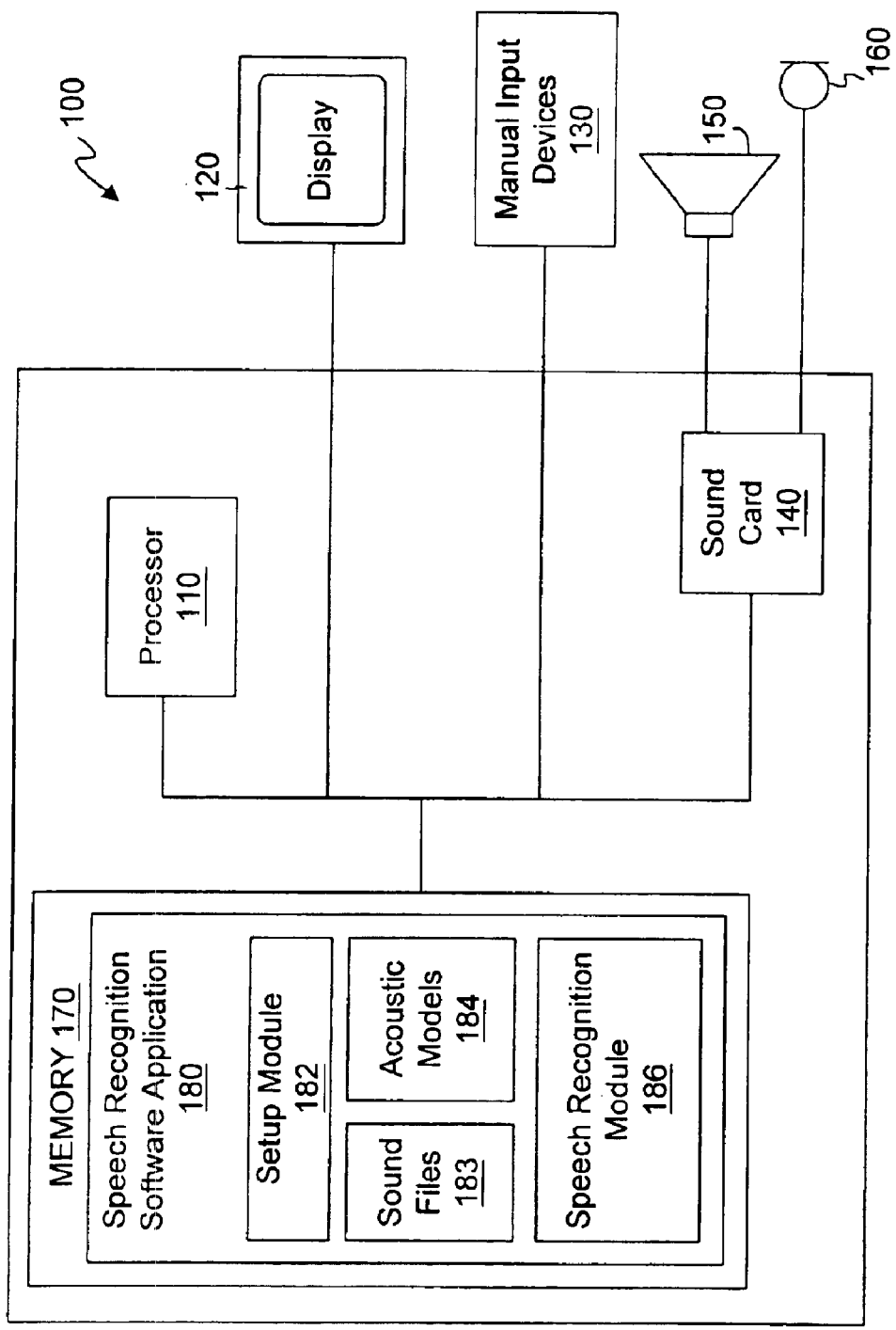
FIG. 1 is a block diagram of a computer system containing a speech-recognition software application in accordance with the invention.

FIG. 1 shows a computer system 100 that serves as the operating platform for a speech-recognition system. The computer system 100 has a processor 110 that, among other functions, executes instructions contained in software applications. A display 120 may be operably connected to the processor 110 to provide the user with a video display. For example, the display 120 may present written instructions to a user regarding the speech-recognition application that will be described below. The system 100 may also have various manual input devices 130, such as a keyboard, a mouse, etc. The microprocessor 110 is also operably connected to a sound card 140. The sound card 140 processes analog signals from a microphone 160 to produce digital signals to the processor 110. The microphone 160 may register the user's voice for speech recognition and other purposes. The sound card 140 also processes digital signals from the processor 110 to produce analog signals to a speaker 150. The speaker 150 may be used to play sample voices, instructions, etc. for the user.

The system 100 has a memory 170 that is accessible by the processor 110. The memory 170 contains speech-recognition software application 180 in accordance with the invention. The memory 170 may also, as is conventional, contain other information, such as instructions for the operation of display 120, manual input devices 130 and sound card 140. Except for the software application 180, the system 100 may consist of components that are known in the art.

The speech-recognition software application 180 contains a setup module 182 that may be activated for each new user. During setup, the setup module 182 may play some or all of sound files 183 for the user, as will be described in detail later. The purpose of playing the sound files 183 is to select an appropriate one of several acoustic models 184 for the new user, as will also be described in detail later. After setup, the system 100 performs speech recognition, and recognizes the user's speech, by operating the speech-recognition module 186, and uses the selected one of the acoustic models 184 in performing the speech recognition.

Figure 2:
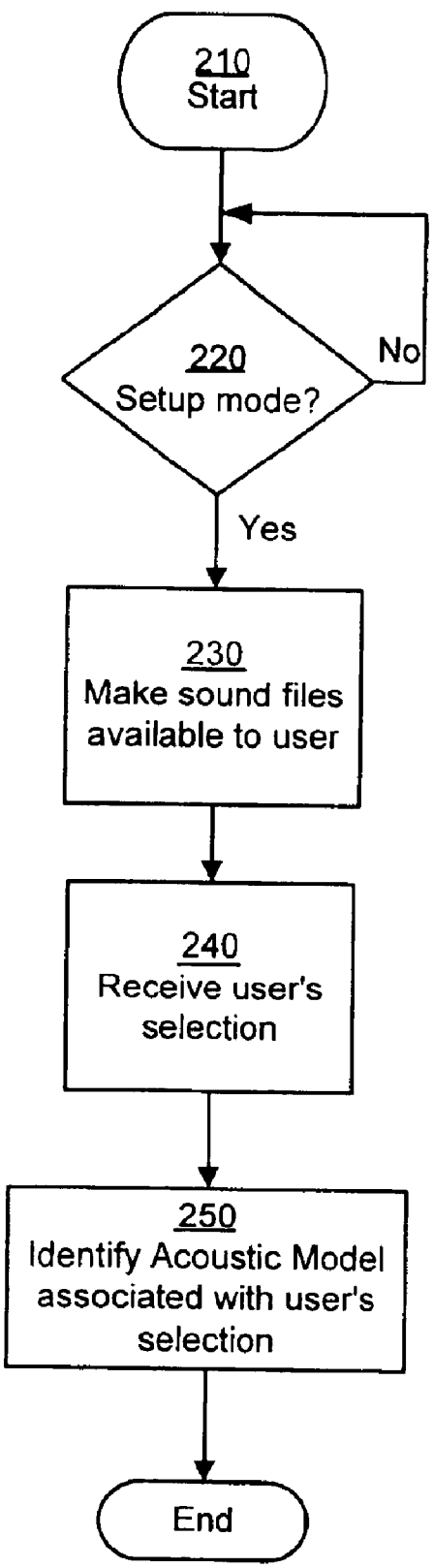
FIG. 2 is a flow chart of steps that may be performed by the software application of FIG. 1.

FIG. 2 is a flow chart of steps that may be performed by the system 100 in learning the speech profile of a new user in accordance with one embodiment of the invention. As is conventional, the system 100 may accommodate many users and select and use different acoustic models for each. A user activates system 100 at step 210. At step 220 the system 100 determines whether it should enter setup mode, that is, activate the setup module 182. For example, when a user causes the system 100 to initiate the software application 180, it may initially determine whether the user has used the software application 180 before. For example, memory 170 may contain information associating the user with a particular acoustic model from a previous session. If an acoustic model is already associated with the user, the system 100 may skip the setup mode. If the system 100 determines that it should select an acoustic model for this user, it proceeds to the next step.

In this embodiment, at 230, the system 100 makes the sound files 183 available to the user for listening and prompts the user to select the sound file that most resembles the user's voice. For example, the sound files may be stored in memory 170 and the system 100 may play them through speaker 150. The sound files contain samples of speech and such samples may consist of recordings of human voices, synthetic voices or combinations of the two.

At the same time, display 120 may present information regarding the sound files. For example, display 120 may display text or graphic objects representing each sound file and instructions for the user to select the best sound file using manual input devices 130. As another example, the voice samples in the sound files 183 may comprise spoken instructions to the user. A first sound file may contain the phrase "does this sound most like your voice" (spoken with a first voice), and the next sound file may contain the phrase "or does this sound most like your voice" (spoken with a second voice).

The system 100 may be provided with a particular number of sound files 183 suitable for the situation where it will be used. For example, the software application 180 may have six sound files, each corresponding to a major geographic area of the United States (e.g., East Coast, Southern, Midwestern and West Coast). As another example, the system 100 may have three sound files corresponding to high-pitch, medium-pitch and low-pitch voices, respectively. Other compilations of sound files 183 containing hundreds or thousands of sound files 183 may be used. The system 100 is not limited to a certain number of sound files 183.

Figure 4:
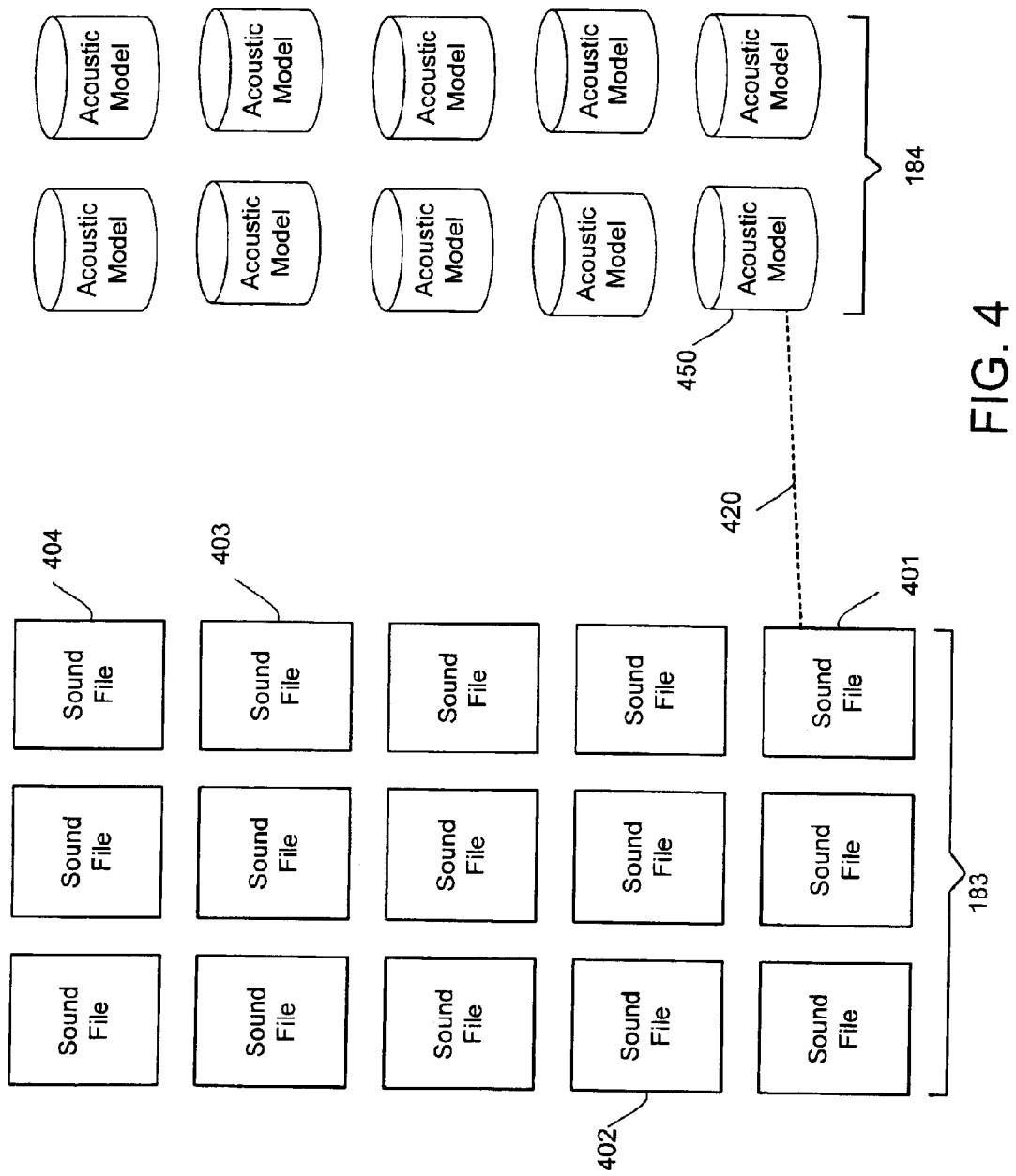
FIG. 4 is a conceptual diagram of the relationship between sound files and acoustic models in one embodiment of the software application shown in FIG. 1.

The system 100 associates each of the sound files 183 with at least one of the acoustic models 184. FIG. 4 is a conceptual diagram of an example of the relationship between sound files 183 and acoustic models 184. For example, sound file 401 may be associated with one acoustic model-namely, acoustic model 450—as indicated by line 420. For clarity, FIG. 4 does not show the corresponding associations between other sound files and acoustic models. The system 100 may store information in memory 170 regarding which acoustic model is associated with each of the sound files 183. If the user selects sound file 401 as the best one, the system 100 will use acoustic model 450 in recognizing the user's speech.

In some embodiments, the system 100 may associate more than one of the sound files 183 with any one of the acoustic models 184. In other embodiments, the system 100 may associate any one of the sound files 183 with more than one of the acoustic models 184. In such embodiments, other methods for selecting acoustic models may be used to select the best one of the acoustic models associated with the chosen sound file. It will be understood that the acoustic models 184 are only conceptually shown in FIG. 4. For example, the acoustic models 184 need not be stored as separate data files; different adjustments of an adjustable acoustic model may serve as the acoustic models 184.

With reference again to FIG. 2, the system 100 receives the user's selection at 240. For example, the system 100 may receive the selection through manual input devices 130 or by the user speaking into the microphone 160. At 250, the system 100 may identify the one of the acoustic models 184 that is associated with the selected sound file. The system 100 may thereafter use the identified acoustic model to recognize the user's speech by activating speech-recognition module 186. For example, after identifying the acoustic model, the system 100 may ask the user whether it should perform speech recognition at this time. The system 100 may store an identifier of the acoustic model together with an identifier for the user in memory 170.

Figure 3:
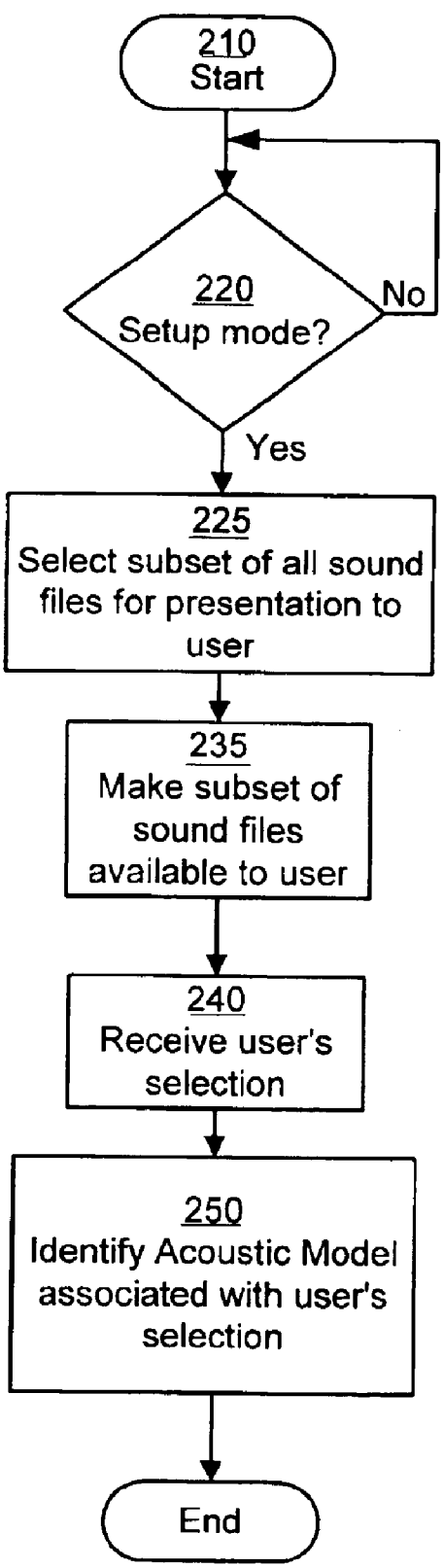
FIG. 3 is another flow chart of steps that may be performed by the software application of FIG. 1.

FIG. 3 is a flow chart showing an alternative embodiment of the acoustic model selection routine that includes additional steps beyond the steps used in the FIG. 2 embodiment. Only steps 225 and 235 differ from the flow chart in FIG. 2 and the common steps need not be described again.

At 225, the system 100 selects a subset of all sound files 183 for presentation to the user. This additional step may be needed, for example, where the system 100 has a large number of sound files 183 and it is impractical to play all of the sound files for the user. The system 100 may therefore first, as part of step 225, gather information that narrows the number of sound files that would most closely resemble the user's voice, and then select a subset of sound files 183 based on the information, as will be described below. In FIG. 4, for example, the system 100 may select sound files 401, 402, 403 and 404 as a subset for a particular user and make them available for listening.

As a first example of step 225, the system 100 may play sound files to the user as part of selecting the subset of sound files 183. For example, step 225 may involve playing a sound file of a high-pitch voice and a sound file of a low-pitch voice and asking the user to select the one that best matches the user's voice. The software application 180 may then select a subset of all sound files 183 depending on the user's response.

A second example of step 225 is that the system 100 may ask one or more questions, where the answer(s) may be indicative of the user's speech. The system 100 may, for example, inquire about the user's age, gender, nationality, geographic background, or other information. The user may answer the question(s) through the microphone 160 or through the manual input devices 130. For example, if the user comes from the East Coast, the system 100 may select the subset to contain sound files consistent with East Coast accents. The questions are selected depending on the circumstances where the system 100 will be used.

As a third example of step 225, the system 100 may prompt the user to read text sequences into the microphone 160 as described in the background section above. Based on the received speech, the system 100 may select a subset of sound files 183 for the user. For example, the system 100 may analyze the received speech using different acoustic models 184 and determine that certain ones of the acoustic models 184 are more appropriate for this user. The system 100 may then select the subset as those sound files 183 that are associated with any of the subject acoustic models.

When the system 100 has selected a subset of the sound files 183, it makes the subset available to the user at step 235. This may be done as described above with regard to step 230 in FIG. 2. When the user has selected the best one in the subset of sound files, the software application 180 may identify the associated acoustic model as described above. Having identified the acoustic model for the user, the system 100 may deactivate setup module 182 and begin recognizing speech using speech-recognition module 186.

As mentioned previously, the inventive speech-recognition system may reside on platforms other than a personal computer. For example, the computer system 100 may be used for speech recognition via telephone, such as in reservation or directory services, or in a voice-mail system that translates a voice-mail to e-mail. In this example the telephone handset may serve as the speaker 150 and the microphone 160, and the user may activate and/or control the system 100 by using the telephone keypad or by using voice commands. In this example, the computing resources and speech recognition software application would likely be at a remote location from the user.

As another example, the computer system 100 may be used for speech recognition via a hand-held device with a wireless connection to a remote computer, such as a Personal Digital Assistant (PDA) with Internet access. In this example, the hand-held device may serve as the speaker 150 and the microphone 160, and the hand-held device may receive the sound files 183 through the wireless connection.

The speech recognition system may also reside on a networked computer system, where computing resources and the speech recognition software application may be accessed by many different remote users. A network may allow several users to set up or use the software application 180 at the same time. The software application 180 may, for example, be used in the banking industry to provide speech-recognition functions to a network of automated teller machines.

A number of embodiments of the invention have been described. Nevertheless, it will be understood that various modifications may be made without departing from the spirit and scope of the invention. For example, it is contemplated that in some embodiments the user selection of the most appropriate sound file may not be the final step in identifying the most appropriate acoustic model for the user. For example, the user selection of a sound file may simply narrow the number of possible acoustic models for the user, and a subsequent method (such as the user reading pre-defined text sequences) may be used to make the final determination of the acoustic model for that user. Accordingly, other embodiments are within the scope of the following claims.

What is claimed is:

1. A method for a speech-recognition system to select an acoustic model for recognizing a user's speech, the method comprising:

making a plurality of speech samples available for listening so that the speech sample most resembling the user's speech may be selected;

receiving the selection; and identifying an acoustic model associated with the selected speech sample for recognizing the user's speech.

2. The method of claim 1, further comprising:

asking a question prior to making available the plurality of speech samples, an answer to the question being indicative of the user's speech; and using the answer to select the plurality of speech samples to be made available for listening.

3. The method of claim 2, wherein the question relates to at least one from the group consisting of the user's gender, nationality, geographic origin and age.

4. The method of claim 1, further comprising:

obtaining information indicative of the user's speech and using the information to select the plurality of speech samples to be made available for listening.

5. The method of claim 4, wherein obtaining the information comprises:

making speech samples available for listening; and receiving the selection of which speech sample most resembles the user's speech.

6. The method of claim 4, wherein obtaining the information comprises registering the user's speech.

7. The method of claim 1, wherein at least one of the speech samples comprises synthetic speech.

8. The method of claim 1, wherein the speech-recognition system resides on a personal computer.

9. The method of claim 1, wherein the speech-recognition system resides on a networked computer system.

10. The method of claim 1, wherein the plurality of speech samples is made available via telephone.

11. Computer-readable medium having stored thereon instructions that when executed perform the following functions:

makes a plurality of speech samples available for listening so that the speech sample most resembling a user's speech may be selected; and identifies an acoustic model associated with the selected speech sample so that the acoustic model may thereafter be used in recognizing the user's speech.

12. The computer-readable medium of claim 11, further comprising the functions:

asks a question prior to making available the plurality of speech samples, an answer to the question being indicative of the user's speech; and uses the answer to select the plurality of speech samples.

13. The computer-readable medium of claim 12, wherein the question relates to at least one from the group consisting of the user's gender, nationality, geographic origin and age.

14. The computer-readable medium of claim 11, further comprising the functions:

obtains information indicative of the user's speech; and uses the information to select the plurality of speech samples.

15. The computer-readable medium of claim 14, wherein obtaining the information comprises the following functions:

makes speech samples available for listening; and receives the selection of which speech sample most resembles the user's speech.

16. The computer-readable medium of claim 14, wherein obtaining the information comprises the following function:

registers the user's speech.

17. A method for a speech-recognition system to select an acoustic model for recognizing a user's speech, the method comprising:

obtaining information indicative of the user's speech and using the information to select a plurality of speech samples;

making the plurality of speech samples available for listening so that the speech sample most resembling the user's speech may be selected;

receiving the selection; and identifying an acoustic model associated with the selected speech sample for recognizing the user's speech.

18. The method of claim 17, wherein obtaining the information comprises asking a question and receiving an answer to the question.

19. The method of claim 17, wherein obtaining the information comprises:

making speech samples available for listening so that the speech sample most resembling the user's speech may be selected; and receiving the selection.

20. The method of claim 17, wherein obtaining the information comprises registering the user's speech.

21. A speech-recognition system comprising:

a plurality of acoustic models for recognizing speech;

a setup module that makes at least some of a plurality of speech samples available for listening so that the speech sample most resembling a user's speech may be selected; and a speech-recognition module that uses an acoustic model associated with the selected speech sample to recognize the user's speech.

22. The speech-recognition system of claim 21, wherein the setup module obtains information indicative of the user's speech and uses the information to select the speech samples that are to be made available for listening.

23. The speech-recognition system of claim 22, wherein the setup module asks a question and receives an answer.

24. The speech-recognition system of claim 22, wherein the setup module makes speech samples available for listening so that a speech sample most resembling a user's speech may be selected, receives the selection, and uses the selection to determine which speech samples of the plurality of speech samples that are to be made available.

25. The speech-recognition system of claim 22, wherein the setup module registers the user's voice.

26. The speech-recognition system of claim 21, residing on a personal computer.

27. The speech-recognition system of claim 21, residing on a networked computer system.

28. The speech-recognition system of claim 21, wherein the setup module makes speech samples available for listening via telephone.

* * * * *